United States Patent [19]
Izumi et al.

[11] Patent Number: 6,032,754
[45] Date of Patent: Mar. 7, 2000

[54] POWER TRANSMISSION FOR SNOWMOBILE

[75] Inventors: Yoshio Izumi; Hitoshi Yokotani; Michio Asumi, all of Saitama, Japan

[73] Assignee: Honda Giken Kogyo Kabushiki Kaisha, Tokyo, Japan

[21] Appl. No.: 09/015,939

[22] Filed: Jan. 30, 1998

[30] Foreign Application Priority Data

Jan. 31, 1997 [JP] Japan ................................. 9-053784

[51] Int. Cl.$^7$ ................. B62M 27/02; B62D 55/00; B62D 55/12
[52] U.S. Cl. .................. 180/190; 180/9.1; 180/9.64
[58] Field of Search .................. 180/190, 191, 180/193, 9.62, 9.64, 9.1

[56] References Cited

U.S. PATENT DOCUMENTS

| | | | |
|---|---|---|---|
| 3,819,000 | 6/1974 | Larsen | 180/5 R |
| 3,870,117 | 3/1975 | Larsen | 180/64 R |
| 4,301,884 | 11/1981 | Taylor | 180/190 |
| 5,038,881 | 8/1991 | Wysocki et al. | 180/184 |
| 5,279,381 | 1/1994 | Fukuda | 180/190 |
| 5,533,585 | 7/1996 | Kawano et al. | 180/190 |
| 5,660,245 | 8/1997 | Marier et al. | 180/190 |

FOREIGN PATENT DOCUMENTS 5286615  7/1997  Japan .

*Primary Examiner*—Matthew C. Graham
*Assistant Examiner*—Jeffrey Woller
*Attorney, Agent, or Firm*—Birch, Stewart, Kolasch & Birch, LLP

[57] ABSTRACT

A power transmission system for a snowmobile reduces the weight thereof, and allows a streamlined body to be obtained. A drive side pulley of a V-belt transmission is mounted on a right end of a crankshaft of an engine. A gear box is disposed on the right side of a driven side pulley of the V-belt transmission at a position near the driven side pulley. The driven side pulley is fastened to an input shaft. Thus, the V-belt transmission and gear box are disposed on the same right side of the engine, so that the connecting shaft for connecting the V-belt transmission to the gear box is shortened and the weight thereof is reduced. Further, the V-belt transmission and the engine are disposed between a pair of right and left main frames, and the gear box is disposed outside of the right main frame, to thereby shorten a distance between the right and left main frames.

14 Claims, 8 Drawing Sheets

POWER TRANSMISSION FOR SNOWMOBILE

BACKGROUND OF THE INVENTION

1. Technical Field of the Invention

The present invention relates to a power transmission for a snowmobile including a steering ski supported on a front body and a track device supported on a rear body.

2. Description of the Background Art

Japanese Patent Laid-open No. Sho 52-86615 discloses a snowmobile in which a track device is driven by transmitting a drive force of an engine to a drive shaft of the track device through a V-belt transmission and a final reduction gear of a chain transmission. In the background art snowmobile, the V-belt transmission and the chain case are disposed separately on the right and left sides of the snowmobile with respect to a crankcase of the engine. A connecting shaft for connecting a driven side of the V-belt transmission to an input side of the chain case crosses the crankcase.

When the V-belt transmission and the chain case are disposed on both sides of the engine as described above, the connecting shaft for transmitting power from the V-belt transmission to the chain case side becomes longer. Also, the weight is increased, with a result that a space in which the connecting shaft is arranged must be enlarged.

Accordingly, a structure capable of reducing the weight and the arrangement space of the connecting shaft is desired in the art. Further, there is a strong demand for a body with a streamlined shape. In this regard, particularly, for a snowmobile in which an engine is disposed between a pair of right and left main frames, care must be taken not to widen a distance between the right and left main frames too much.

SUMMARY OF THE INVENTION

To achieve the above object, the present invention provides a power transmission for a snowmobile. The snowmobile includes a steering ski supported on a front portion of the body, a track device suspended from a rear portion of the body, and an engine supported on the body at a position between the steering ski and the track device. The power transmission includes a V-belt transmission and a final reduction gear for transmitting a drive force of the engine to a drive shaft of the track device. A drive side pulley of the V-belt transmission is mounted on one end of a crankshaft of the engine. The final reduction gear includes a gear box for connecting a driven shaft of the V-belt transmission to the drive shaft of the track device. The gear box and the V-belt transmission are disposed on the same side of the snowmobile with respect to the engine.

In the above power transmission, the gear box may be disposed outward in the width direction of the body from the driven side pulley of the V-belt transmission.

The snowmobile preferably includes a pair of right and left main frames extending obliquely downward and rearwardly from a steering shaft of the steering ski. The engine is preferably mounted between the right and left main frames; the V-belt transmission is disposed between the right and left main frames; and the gear box is disposed outside the main frames. More preferably, the engine, the V-belt transmission, and the gear box are disposed in an approximately N-shape in a side view, and a path of the power transmission system crosses the main frames in the vertical direction.

Since the gear box and the V-belt transmission are disposed on the same side with respect to the engine, the V-belt transmission can be disposed on one side of the engine at a position near the engine. Also, the gear box can be disposed at a position near the V-belt transmission. Accordingly, when the driven side of the V-belt transmission is connected to the input side of the gear box either through the same shaft or through a driven shaft and an input shaft, the connecting shaft can be formed of an extremely short and relatively thin member. This makes it possible to reduce the weight of the connecting shaft, and reduce the amount of space taken up by the connecting shaft.

Since the gear box is disposed outwardly in the width direction of the body from the driven side pulley of the V-belt transmission, the gear box connected to the drive shaft of the track device is positioned on the outermost side of the power transmission system. As a result, the components forming the power transmission system can be made compact in the width direction of the body, so that a streamlined body shape can be obtained.

The engine is disposed between the pair of right and left main frames, the V-belt transmission is disposed between the right and left main frames and the gear box is disposed on the right side of the main frames. Accordingly, the distance between the right and left main frames can be reduced. Further, since the engine, V-belt transmission, and gear box are disposed in an approximately N-shape in a side view, and the path of the power transmission system crosses the main frames in the vertical direction, the distance between the right and left main frames can be reduced. In this way, the body can be made compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
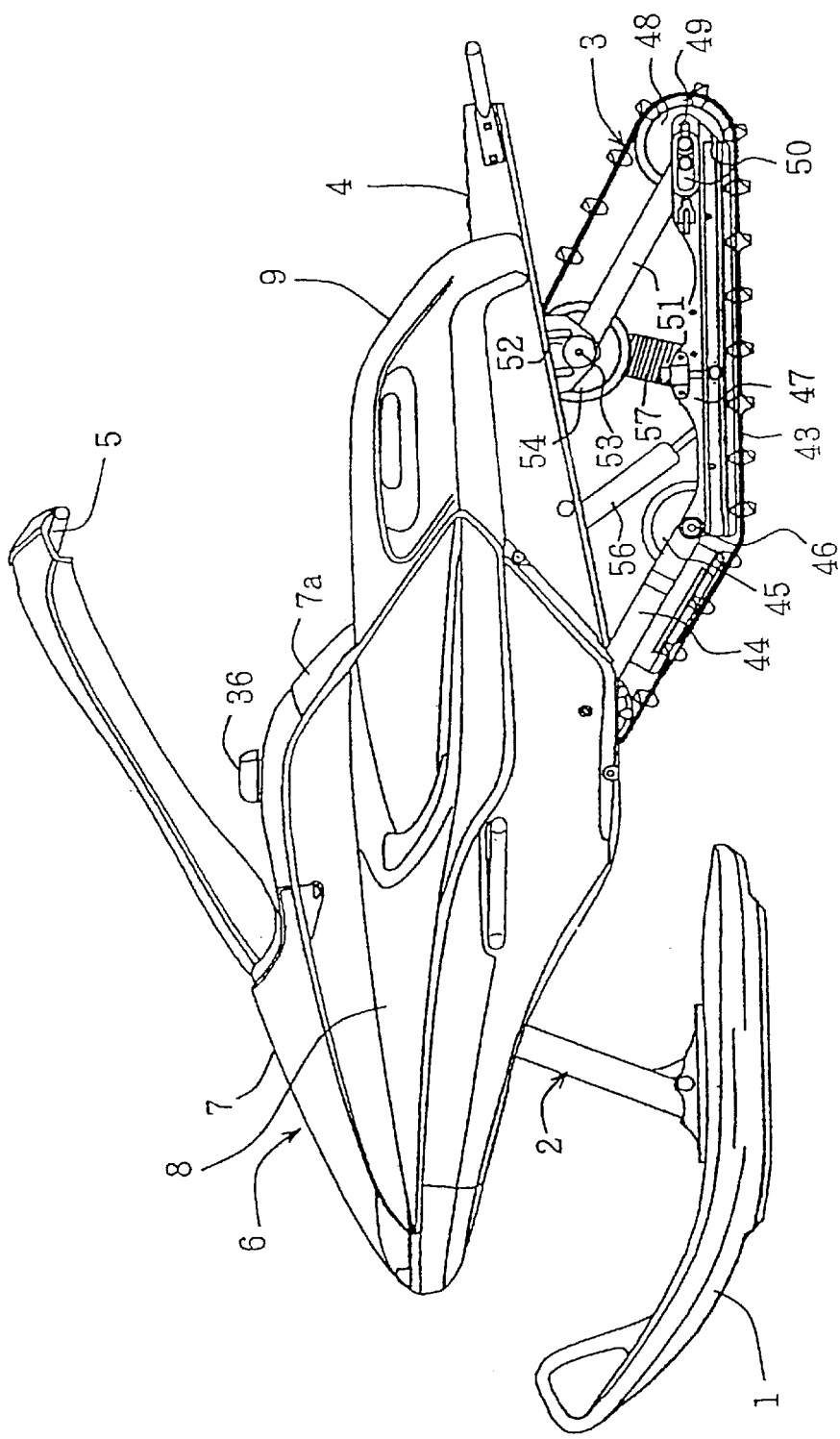
FIG. 1 is a side view of a snowmobile according to the present invention.

A schematic structure of the entire snowmobile will be first described with reference to FIGS. 1 and 2. The front body portion of the snowmobile includes a steering ski 1 supported by a telescopic erecting front suspension 2. The rear body of the snowmobile includes a track device 3 driven by an engine, which will be described in more detail later. A floor 4 is provided over the track device 3. A driver stands on the floor 4 and operates a handlebar 5 to steer the snowmobile. The floor 4 is formed into an approximately reversed U-shape viewed in transverse cross-section. Right and left side surfaces of the floor 4 are formed as erected walls.

A body cover 6 includes a front cover 7, side covers 8, and a rear cover 9. The front cover 7 covers a portion extending rearwardly over an engine compartment at the front body. The side covers 8 cover portions of the body on both sides of the front cover 7. The rear cover 9 extends longer rearwardly from the side covers 8 along right and left sides of the floor 4 and covers side portions of a driver's space over the floor 4.

Figure 2:
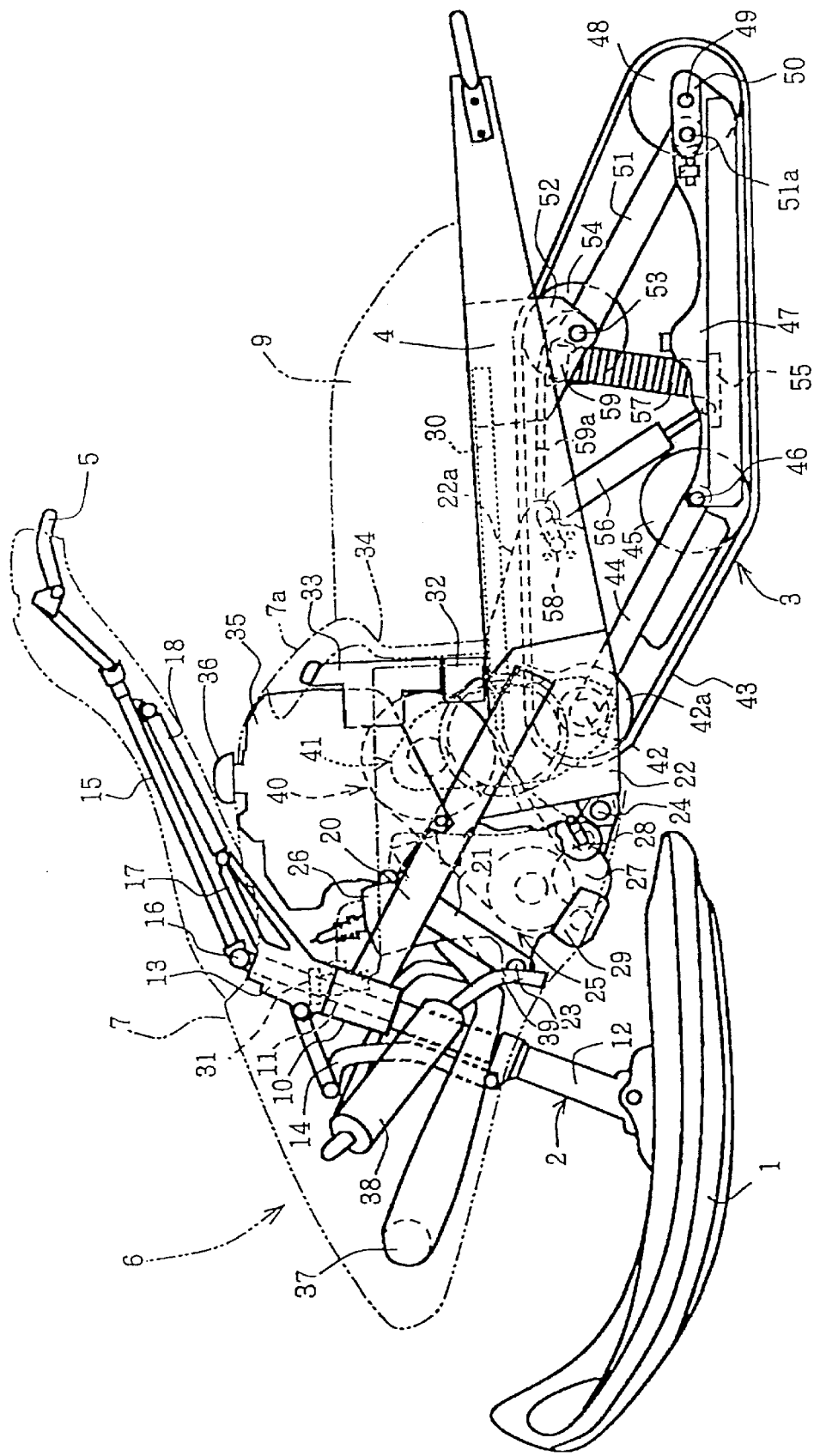
FIG. 2 is a side view of the snowmobile with the body cover removed therefrom.

As shown in FIG. 2, a head pipe 10 is provided at the front body. The front suspension 2 is fixedly surrounded by the head pipe 10. An inner tube 11 of the front suspension 2 extends obliquely in the vertical direction, with a lower end portion thereof rotatably supported by an outer tube 12.

A handle boss 13 is mounted around an outer periphery of an upper end portion of the inner tube 11 and rotatable with the inner tube The handle boss 13 is connected to the upper end portion of the outer tube 12 with a suspension link 14.

The suspension link 14 is extensible by vertical movement of the outer tube 12. An intermediate portion of the suspension link 14 projects forwardly to sufficiently ensure a chamber space (described later) surrounded by a portion of the body cover 6 and positioned in front of the head pipe 10.

A lower end portion of a handle post 15 is connected to a top portion of the handle boss, and is vertically rockable through a handle post pivot 16. A handle link 18 composed of a damper is mounted between a link stay 17 and a portion of the handle post 15 near the handlebar 5. The link stay 17 integrally extends obliquely upwardly and rearwardly from the top portion of the handle boss 13.

The front suspension 2, head pipe 10, and handle boss 13 form a steering shaft of the steering ski 1. The handle post pivot 16 is positioned between a rear end portion of the steering ski 1 and a front end portion of the track device 3.

Right and left main frames 20 extend obliquely downwardly and rearwardly from the head pipe 10. Each of the main frames 20 has a down-tube 21 and a pivot plate 22. The down-tube 21 extends downwardly from a portion of the main frame 20 near the head pipe 10. The pivot plate 22 extends downwardly from a rear portion of the main frame 20.

A water-cooled two-cycle single-cylinder engine 25 is supported on the body by elastic members 23 and 24 provided on the down-tubes 21 and the pivot plates 22, respectively. A cylinder portion 26 of the engine 25 is positioned between the right and left main frames 20 The center of the engine 25 is positioned at an approximately central portion of the body.

A water pump 28 and an oil pump 29 are provided on a lower portion of a crankcase 27 of the engine 25. The water pump 28 is used to supply cooling water from a heat exchanger into the cylinder portion 26. The heat exchanger 30 is contained in a ceiling portion of the floor 4. The cooling water from the cylinder portion 26 is fed to the heat exchanger 30 to be effectively cooled, and is then returned into the water pump 28. A water inlet 31 of the heat exchanger 30 is provided at the side of the head pipe 10.

The heat exchanger 30 has a width nearly equal to a width of the ceiling portion of the floor 4. Accordingly, the heat exchanger has a wide surface area. Also, the heat exchanger 30 is superimposed on the ceiling portion of the floor 4 in the vertical direction to mutually increase the rigidities of the heat exchanger 30 and the floor 4.

The oil pump 29 is connected to an oil tank 33 supported on an upper front portion of the floor 4 together with a battery 32. Maintenance of the battery 32 and the oil tank 33 can be performed by opening a lid 34 formed to a partitioning wall 7a which longitudinally partitions the driver's space over the floor 4 from the engine compartment in front of the driver's space.

The partitioning wall 7a is formed of a portion of the front cover 7 which curves around a back surface of a fuel tank 35 while covering an upper surface of the fuel tank 35. The fuel tank 35 is positioned in front of the battery 32 and the oil tank 33, and is supported on the main frames 20. A fuel tank cap 36 is located on the top of the fuel tank 35.

An exhaust chamber 37 extends forwardly from an exhaust port of the engine 25, and is arranged in the chamber space surrounded by the body cover 6 positioned in front of the engine 25. In the chamber space, the exhaust chamber 37 extends in the form of an approximately semicircular shape in a plan view along the inner surface of the body cover 6. A silencer 38 connected to the exhaust chamber 37 is disposed along the upper side of the exhaust chamber 37. The piping of the exhaust system thus meanders in an approximately two-stage manner. The exhaust gas is exhausted downwardly toward the front side of the engine 25 from a tail pipe 39.

The drive output of the engine 25 is transmitted through a V-belt transmission 40 to a gear box 41 containing a final reduction gear mechanism. The gear box 41 is supported on the main frames 20 and the pivot plates 22, and is adapted to reduce the drive speed transmitted from the V-belt transmission 40 and to rotate a drive shaft 42.

Drive wheels 42a are integrally supported by the drive shaft 42, and are rotated integrally with the drive shaft 42. Outer peripheral portions of the drive wheels 42a are meshed with irregularities formed on the inner surface of a track belt 43 for driving the track belt 43.

The left end portion of the drive shaft 42 is supported by the pivot plate 22, and the right end portion is supported by the gear box 41. Front end portions of a pair of right and left rear arms 44 extend obliquely downwardly and rearwardly from the drive shaft 42. The right and left rear arms 44 are rotatably supported around both end portions of the drive shaft 42. Both rear end portions of the rear arms 44 are connected to front end portions of right and left side rails 47 extending parallel to each other through an idle shaft 46 of an idle wheel 45.

Shaft position adjusting plates 50 for supporting the idle shaft 49 of the idle wheel 48 are supported by both rear end portions of the side rails 47, and are movable fore and aft. A lower end portion of a rear link 51 disposed in parallel to the rear arm 44 is connected to each shaft position adjusting plate 50 through a connecting member 51a.

An upper end portion of the rear link 51 is rotatably mounted to a stay 52 projecting downwardly from a side surface of the floor 4 through an idle shaft 53. A track belt 43 is wound around idle wheels 54 supported by the idle shaft 53, additional idle wheels 46 and 48, and the drive wheels 42a supported by the drive shaft 42, to constitute the track device 3.

The track device 3 forms a parallelogram link formed of the floor 4, rear arms 44, side rails 47, and rear links 51. A cross-plate 55 is formed between intermediate portions of the right and left side rails 47. A damper 56 and a suspension spring 57, which constitute a rear suspension, extend obliquely vertically from the cross-plate 55, and widen in an inverted V-shape toward the upper side when viewed from the side.

An upper end portion of the damper 56 is supported by a cross-pipe 58. The cross-pipe is supported between right and left extensions 22a extending rearwardly in the floor 4 from rear portions of the pivot plates 22. An upper end portion of the suspension spring 57 is supported by a spring holder 59, which is pivotally supported by the idle shaft 53. The spring holder 59 is supported by a rear end portion of a spring holder rod 59a. The spring holder rod 59a extends rearwardly with its front end fastened with an upper end portion of the damper 56.

Next, a detailed discussion of the drive/power transmission system will be made with reference to FIGS. 3 to 8. The drive/power transmission system includes the engine 25, V-belt transmission 40 and gear box 41, which are disposed in an approximately N-shape (see FIG. 5). As shown in FIG. 4, the engine 25 is a two cycle engine which draws in air through a carburetor 19 and into a crankcase 27. The air is preliminarily compressed in the crankcase 27.

Figure 3:
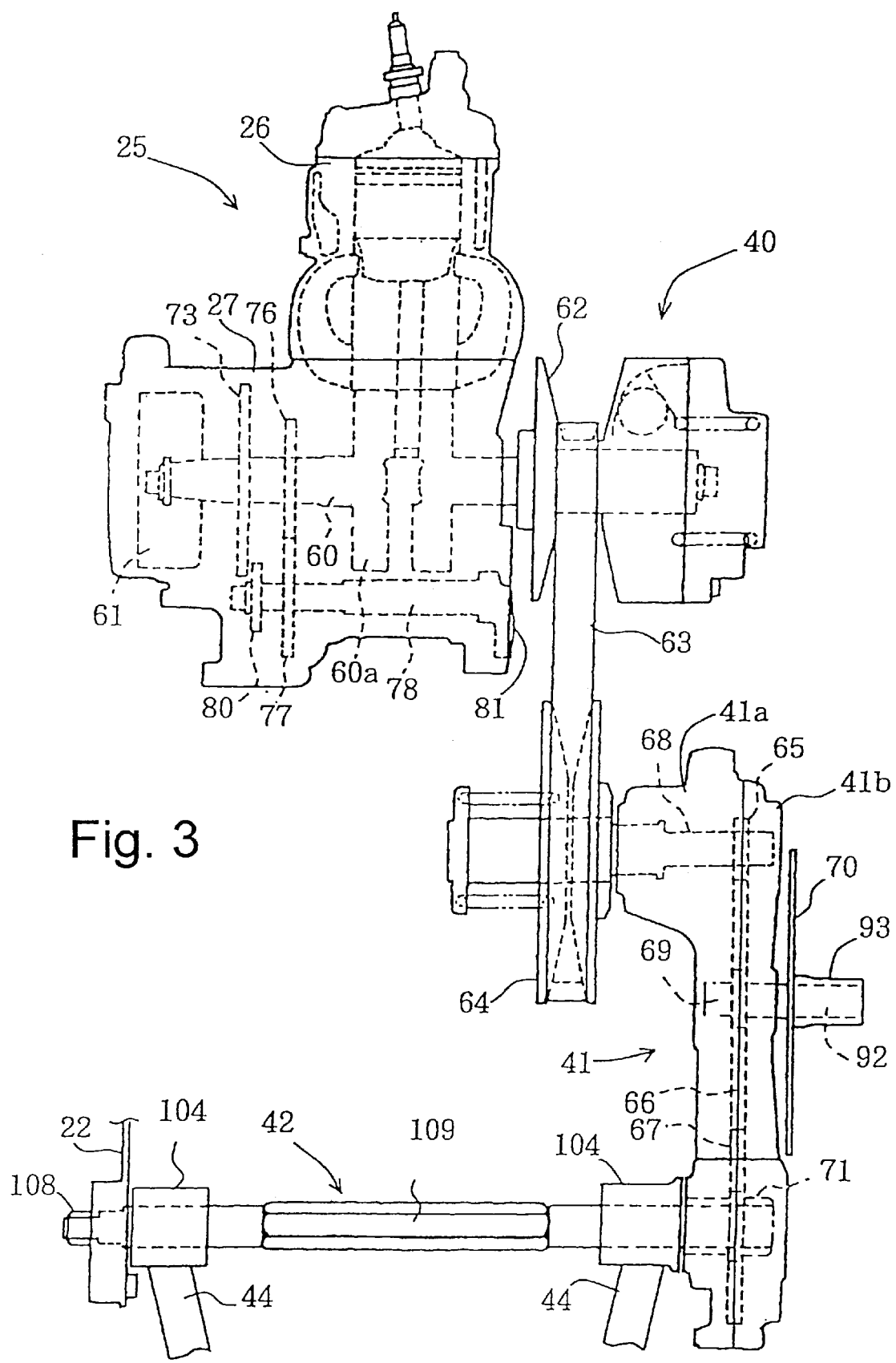
FIG. 3 is a schematic plan view in development of a drive/power transmission system.
Figure 4:
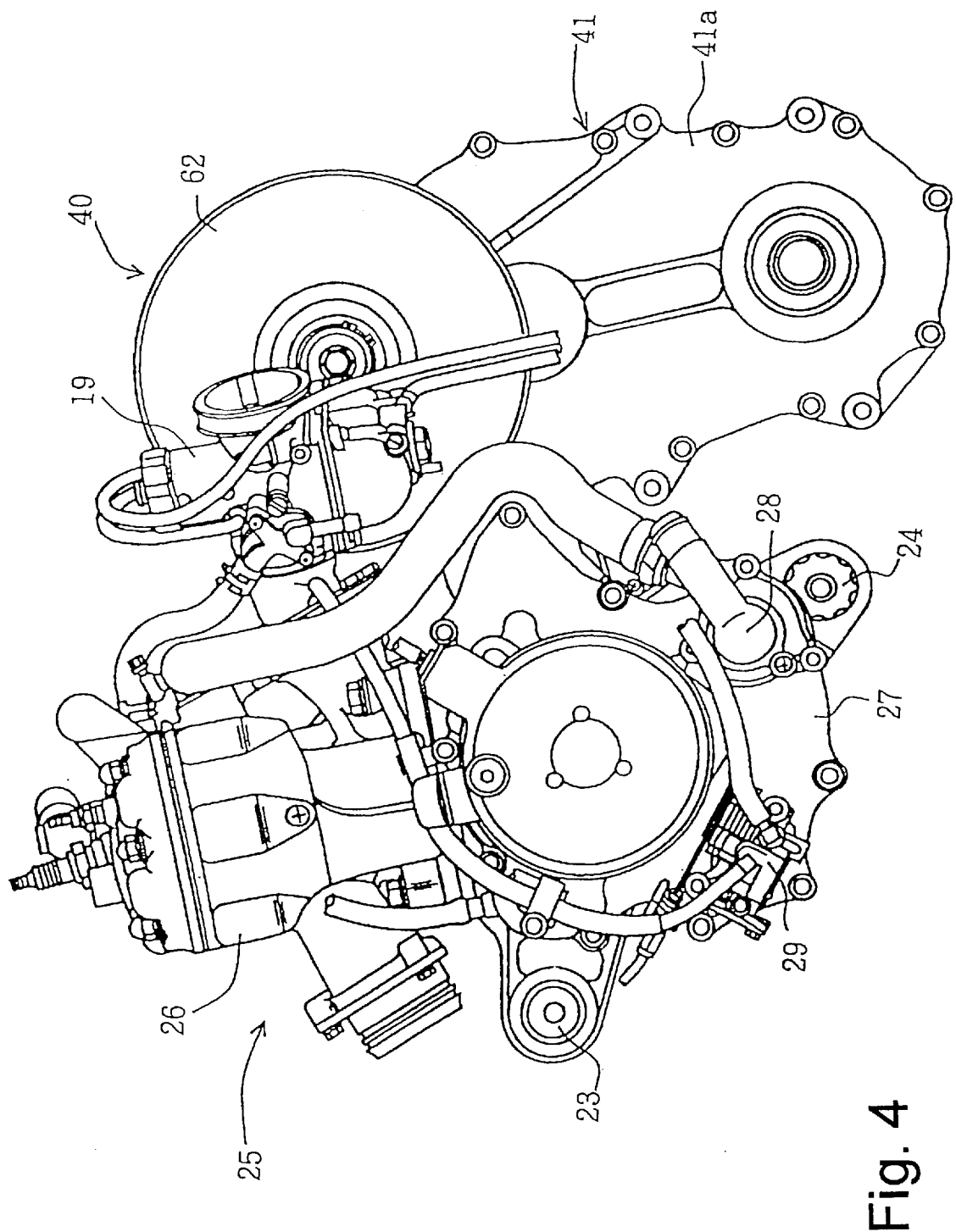
FIG. 4 is a left side view of the drive/power transmission system.
Figure 5:
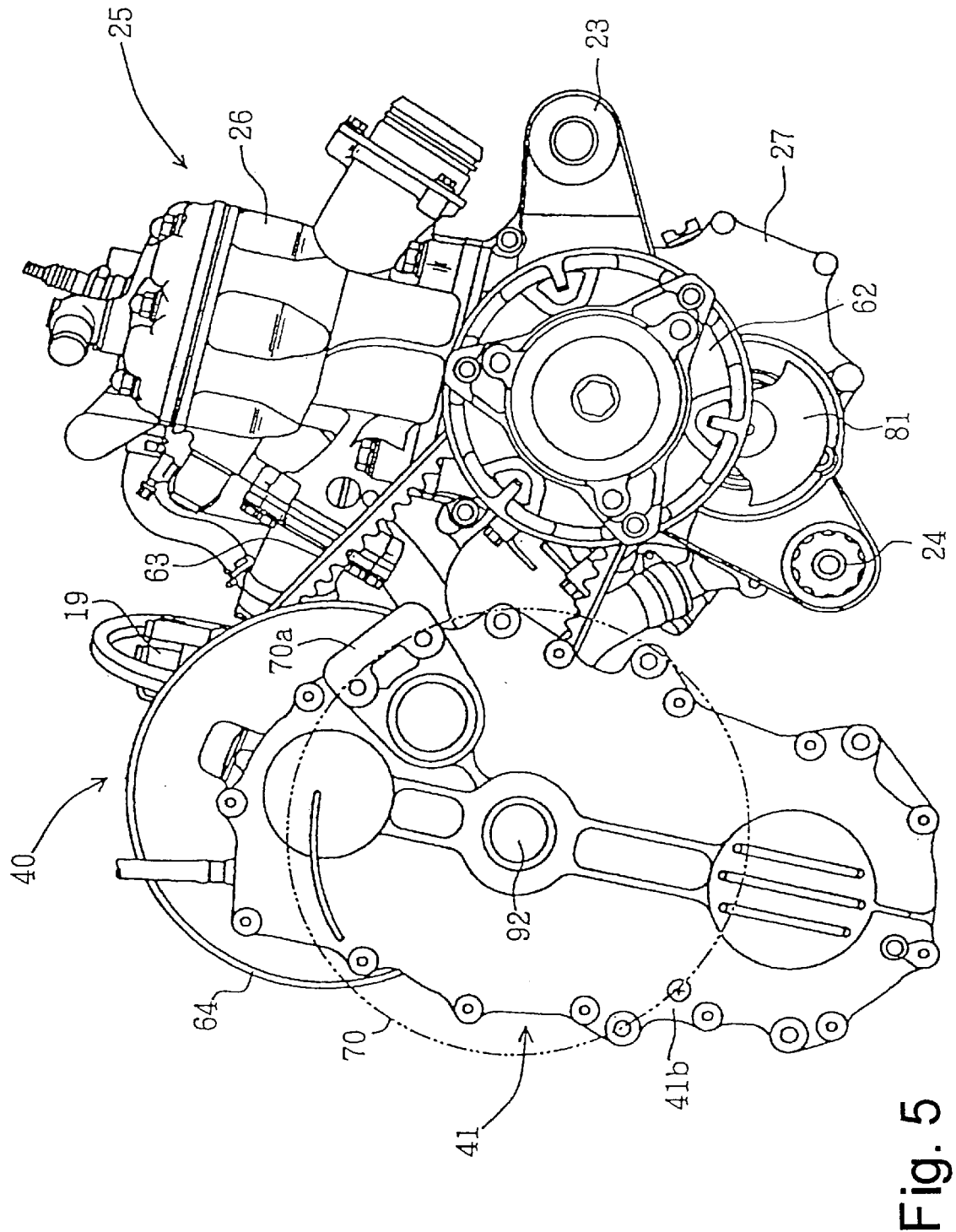
FIG. 5 is a right side view of the drive/power transmission system.

FIG. 3 shows a schematic configuration of the drive/power transmission system. Referring to FIG. 3, one end of a crankshaft 60 of the engine 25 is mounted with an ACG 61 and the other end thereof extends outwardly from the crankcase 27. A drive side pulley 62 of the V-belt transmission 40 is mounted to the extension of the crankshaft 60. In the V-belt transmission 40, a V-belt 63 is wound around the drive side pulley 62 and a driven side pulley 64 disposed rearwardly and upwardly of the drive side pulley 62 (see FIGS. 3 and 5), to perform a primary continuously variable transmission of the rotational output of the crankshaft 60 on the side.

Figure 7:
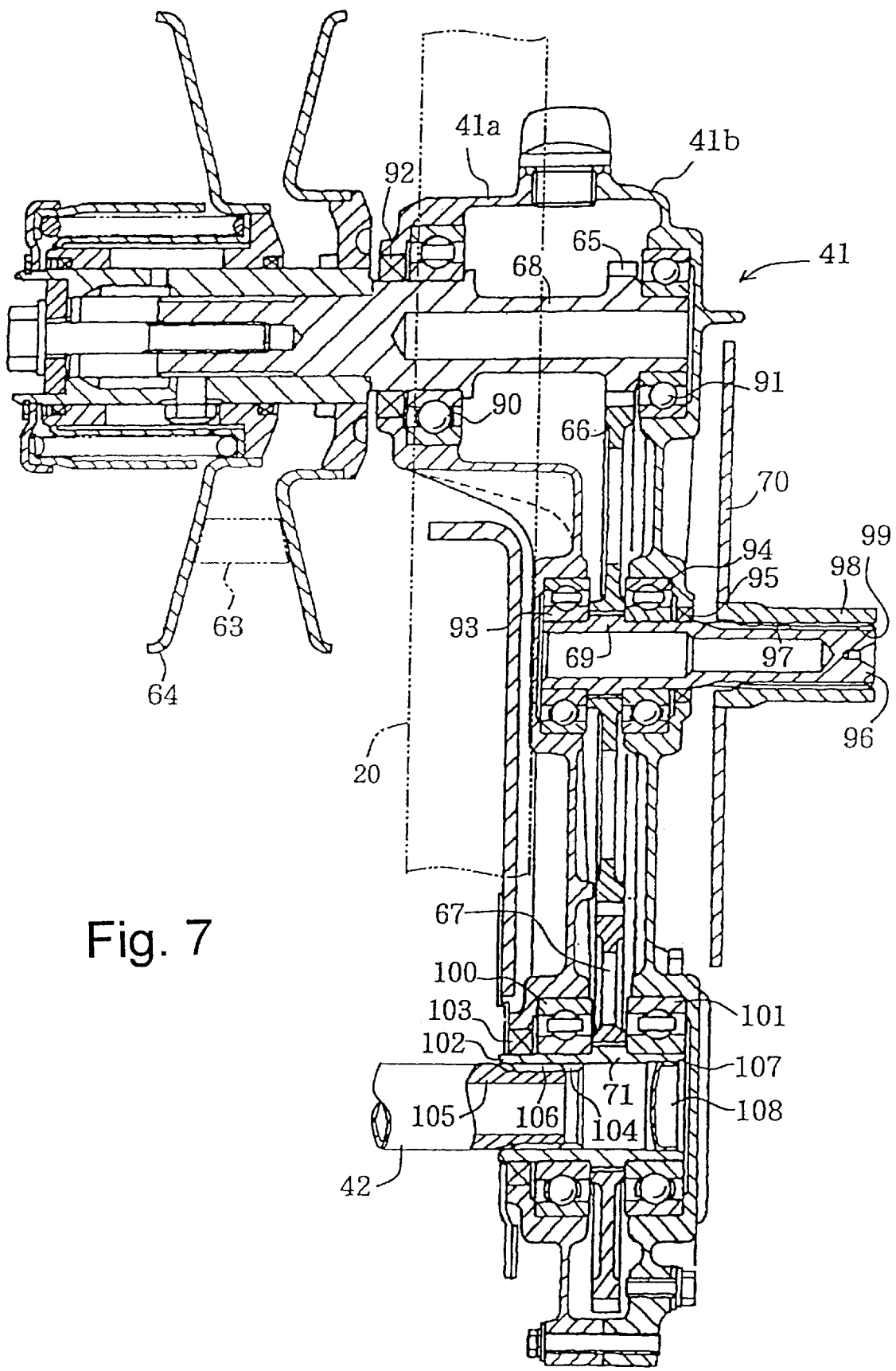
FIG. 7 is a sectional view of a driven side pulley and a final reduction gear portion.

With respect to the arrangement of the parts constituting the drive/power transmission system, the gear box 41 is disposed rightward in the width direction of the body from the drive side pulley 62 of the V-belt transmission 40 and also rightward from the main frames 20 (see FIG. 7). The engine 25 and the V-belt transmission 40 are disposed inside the right and left main frames 20. The V-belt transmission 40 is held between the gear box 41 and the engine 25.

The gear box 41 includes a case composed of right and left halves 41b and 41a. A biaxial in-line gear train composed of an input gear 65, an idle gear 66 and a final gear 67 is contained in the case. An input shaft 68 mounted with the input gear 65 extends outwardly from the gear box 41. The driven side pulley 64 is mounted to the extension of the input shaft 68.

An idle shaft 69 mounted with the idle gear 66 extends outwardly from the gear box 41 opposite to the input shaft 68. A brake disk 70 is mounted to the extension of the idle shaft 69. The brake disk 70 is braked by a brake caliper 70a provided on the half case 41b of the gear box 41 (see FIG. 5).

A final shaft 71 is mounted with the final gear 67, and comprises a hollow shaft. One end of the drive shaft 42 is removably fitted into the final shaft 71. The gear box 41 having the gear train therein is filled with lubricating oil.

Figure 6:
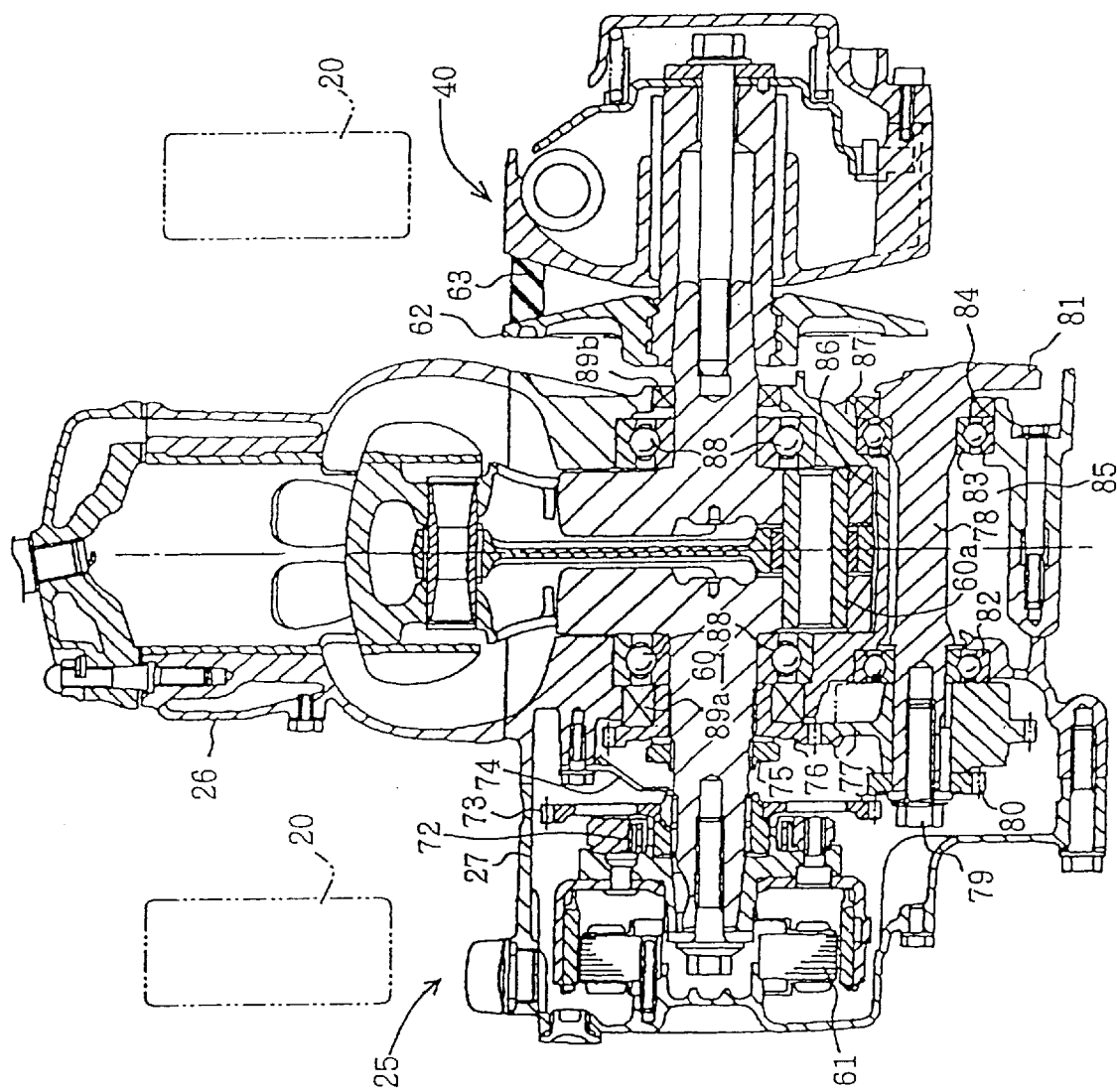
FIG. 6 is a sectional plan view of an engine portion.

Referring now to FIG. 6, a starter driven gear 73 is supported at a portion near the ACG 61 by the crankshaft 60 of the engine 25 through a one-way clutch 72. The movement of the starter driven gear 73 in the thrust direction is restricted by a gear presser plate 74. A balancer drive gear 76 is provided on the crankshaft 60 and fastened by a nut 75. The balancer gear 76 is meshed with a balancer driven gear 77 for rotating a balancer shaft 78 disposed parallel to the crankshaft 60.

A pump drive gear 80 is mounted on one end of the balancer shaft 78 with a bolt 79. A balancer weight 81 is integrally provided on the other end of the balancer shaft 78. Two intermediate portions of the balancer shaft 78 near the balancer driven gear 77 and the balancer weight 81 are rotatably supported on the crankcase 27 by bearings 82 and 83. A seal 84 is provided outside of the bearing 83 on the balancer weight 81 side.

A balancer chamber 85 for containing the balancer shaft 78 is partitioned, by a journal wall 87, from a crank chamber 86 for containing a crank weight 60a of the crankshaft 60. The balancer driven gear 77 and the balancer weight 81 are disposed outside the crank chamber 86. The balancer chamber 85 is filled with lubricating oil in the crank case 27, and the bearings 82 and 83 are dipped in the oil. The balancer chamber 85 is sealed from the exterior with a seal 84.

The crankshaft 60 is rotatably supported, at a portion near the crank weight 60a, on a journal wall 87 by a bearing 88. The outside of the crank chamber 86 is sealed with seals 89a and 89b.

As will be apparent from FIG. 7, the input shaft 68 of the gear box 41 is rotatably supported by bearings 90 and 91. The extension of the input shaft 68 extending from the gear box 41 on the driven side pulley 64 side is provided with a seal 92.

The idle shaft 69 is similarly rotatably supported by bearings 93 and 94. The extension of the idle shaft 69 extending from the gear box 41 on the brake disk 70 side is provided with a seal 95. A spline groove 97 is formed in an outer peripheral portion of the extension portion 96. A boss 98 to be fitted around the outer periphery of the extension portion 96 is provided at a central portion of the brake disk 70. A spline groove 99 is formed in an inner peripheral surface of the boss 98, and is engaged with the spline groove 97, whereby the boss 98 is movable in the axial direction.

The final shaft 71 is similarly rotatably supported by bearings 100 and 101. The final shaft 71 is a hollow shaft with one end 102 being opened on a side surface of the gear box 41. A seal 103 is provided around the one end 102. A spline groove 104 is formed in an inner surface of the one end 102 to extend inwardly from the open end side.

One end 105 of the drive shaft 42 is fitted on the one end 102 side. A spline groove 106 formed in an outer peripheral portion of the one end 105 is engaged with the spline groove 104, allowing the final shaft 71 to be rotated integrally with the drive shaft 42. A cap 108 is fitted in the other end 107 of the final shaft 71 to seal the hollow final shaft 71.

Figure 8:
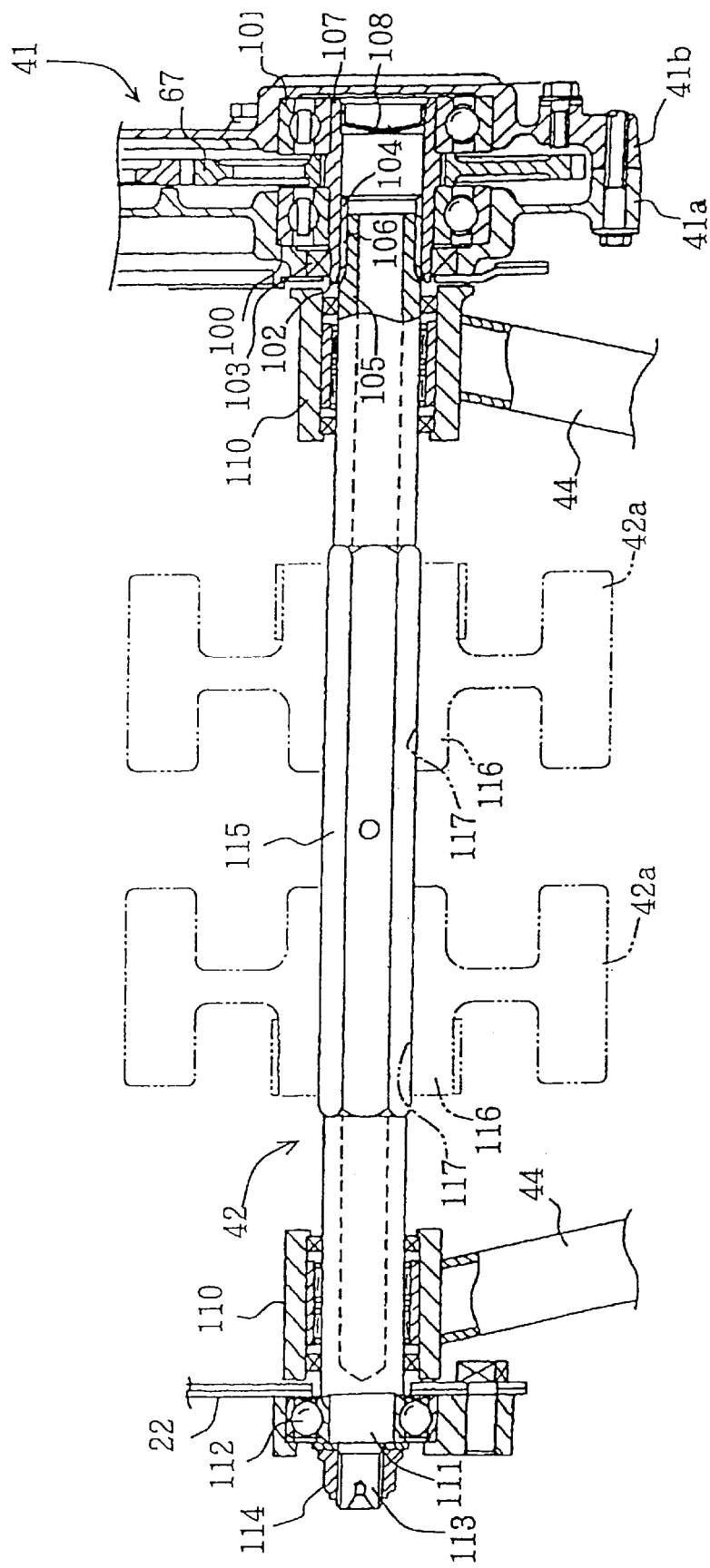
FIG. 8 is a drive shaft supporting structure of a track device.

As will be apparent from FIG. 8, both end portions of the drive shaft 42 pass through and are supported by bearing supporting portions 110 provided at front end portions of the right and left rear arms 44. The other end opposite to the one end 105 forms a small diameter portion 111 which is rotatably supported by a bearing 112 supported by the pivot plate 22. A leading end of the small diameter portion 111 forms a projecting threaded portion 113 which is fastened to the bearing 112 by a nut 114.

An outer periphery of the intermediate portion of the drive shaft 42 is formed into a hexagonal portion 115 to be engaged with hexagonal holes 117 formed in centers of the boss portions 116 of the drive wheels 42a, whereby the drive wheels 42a are rotatable integrally with the drive shaft 42.

The function of this embodiment will be described below. As shown in FIG. 3, since the gear box 41 and the V-belt transmission 40 are offset on the same right side of the body with respect to the engine 25 positioned substantially at a central portion of the body, the V-belt transmission 40 can be disposed on one side of the engine at a position near the engine 25. Also, the gear box 41 can be positioned near the V-belt transmission 40. Accordingly, the driven side pulley 64 of the V-belt transmission 40 can be supported by the input shaft 68 of the gear box 41. As a result, the input shaft 68 can be formed of an extremely short and relatively thin member. This makes it possible to reduce the number of parts, and to reduce the weight and the arrangement space of the input shaft 68.

Since the connecting shaft (input shaft 68) for connecting the driven side pulley 64 to the gear box 41 is short, the bearings 90, 91 for rotatably supporting the input shaft 68 can be disposed in the gear box 41. As a result, it is possible to improve the lubrication of the bearings and to reduce the size of the bearing portion.

If the connecting shaft is long as in the background art structure, the bearing portion must be provided independently outside of the gear box 41. Consequently, the bearings of the bearing portion cannot be disposed in the oil. Therefore, the bearing portion must be enlarged for ensuring durability, and maintenance for lubrication is more laborious.

Since the gear box 41 is disposed outwardly in the width direction of the body from the driven side pulley 64 of the V-belt transmission 40, the gear box 41 required to be connected to the drive shaft 42 of the track device 3 is positioned on the outermost side of the power transmission system. As a result, the parts constituting the power transmission system in the width direction of the body can be made compact, so that the width of the body can be narrowed to realize the streamlined shape of the body.

Although the engine 25 is disposed between the pair of right and left main frames 20, the V-belt transmission 40 is disposed between the right and left main frames 20 and the gear box 41 is disposed on the right side of the main frames 20. Thus, a distance between the right and left main frames 20 does not have to be widened very much.

Further, since the engine 25, V-belt transmission 40, and gear box 41 are disposed in an approximately Nshape in a side view and the path of the power transmission system crosses the main frames 20 in the vertical direction, the distance between the right and left main frames 20 does not have to be widened very much, and the body can be made compact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission for a snowmobile having a body, a steering ski supported on a front portion of the body, a pair of right and left main frames extending obliquely downwardly and rearwardly from a steering shaft of said steering ski, a track device suspended from a rear portion of the body, and an engine supported on the body at a position between said steering ski and said track device, said power transmission comprising:

a V-belt transmission and a final reduction gear for transmitting a drive force of said engine to a drive shaft of said track device;

said V-belt transmission including a drive side pulley mounted on one end of a crankshaft of said engine, and a driven shaft; and said final reduction gear including a gear box for connecting the driven shaft of said V-belt transmission to said drive shaft of said track device, wherein said gear box and said V-belt transmission are disposed on a same lateral side of said body with respect to said engine, said gear box is disposed outwardly in the width direction of the body from a driven side pulley of said V-belt transmission, and said engine is mounted between said right and left main frames, said V-belt transmission is disposed between said right and left main frames, and said gear box is disposed laterally outside of said main frames.

2. The power transmission for a snowmobile according to claim 1, wherein said engine, said V-belt transmission, and said gear box are disposed in an approximately N-shape in a side view.

3. The power transmission for a snowmobile according to claim 2, wherein a path of said power transmission system crosses said main frames in the vertical direction.

4. A power transmission for a snowmobile comprising:

a variable-ratio transmission having a drive pulley connectable to an output shaft of a power source, a driven pulley, and a flexible rotation transferring member rotationally coupling said drive pulley with said driven pulley;

a gear box having an input gear and an output gear therein;

a connecting shaft supporting both said driven pulley of said variable-ratio transmission and said input gear thereon; and a pair of right and left main frame members, wherein said output shaft extends from a lateral side of said power source, and said gear box and said variable-ratio transmission are both disposed on said lateral side of said power source, and said engine is mounted between said right and left main frame members, said variable-ratio transmission is disposed between said right and left main frame members, and said gear box is disposed laterally outside of one of said right and left main frame members.

5. The power transmission for a snowmobile according to claim 4, wherein said variable-ratio transmission is disposed laterally outwardly from said power source in a first direction, and said gear box is disposed laterally outwardly from said variable-ratio transmission in said first direction.

6. The power transmission for a snowmobile according to claim 4, wherein said flexible rotation transferring member is a belt.

7. A power transmission for a snowmobile comprising:

a variable-ratio transmission having a drive pulley connectable to an output shaft of a power source, a driven pulley, and a flexible rotation transferring member rotationally coupling said drive pulley with said driven pulley;

a gear box having an input gear and an output gear therein;

a connecting shaft supporting both said driven pulley of said variable-ratio transmission and said input gear thereon; and a pair of bearings located within said gear box and supporting said connecting shaft, said connecting shaft being exclusively rotatably supported by said pair of bearings, wherein said output shaft extends from a lateral side of said power source, and said gear box and said variable-ratio transmission are both disposed on said lateral side of said power source.

8. A snowmobile comprising:

a body;

a steering ski supported on a front portion of the body;

a track device suspended from a rear portion of the body;

a pair of right and left main frame members;

an engine supported on the body at a position between said steering ski and said track device, said engine having an output shaft extending outwardly from a lateral side thereof;

a variable-ratio transmission having a drive pulley connected to said output shaft of said engine, a driven pulley, and a rotation transferring member rotationally coupling said drive pulley with said driven pulley;

a gear box having an input gear and an output gear therein;

a connecting shaft supporting both said driven pulley of said variable-ratio transmission and said input gear thereon; and a drive shaft supporting said output gear thereon for rotatably driving said track device, wherein said gear box and said variable-ratio transmission are each disposed on said lateral side of said engine, said engine is mounted between said right and left main frame members, said variable-ratio transmission is disposed between said right and left main frame members, and said gear box is disposed laterally outside of one of said right and left main frame members.

9. The snowmobile according to claim 8, further comprising bearings supporting said connecting shaft, said bearings being located within said gear box.

10. The snowmobile according to claim 8, wherein said rotation transferring member is a flexible belt.

11. The snowmobile according to claim 8, wherein said pair of right and left main frame members extend obliquely downwardly and rearwardly from a steering shaft of said steering ski.

12. The snowmobile according to claim 11, further comprising a pair of bearings located within said gear box and supporting said connecting shaft, said connecting shaft being exclusively rotatably supported by said pair of bearings.

13. A snowmobile comprising:

a body;

a steering ski supported on a front portion of the body;

a track device suspended from a rear portion of the body;

an engine supported on the body at a position between said steering ski and said track device, said engine having an output shaft extending outwardly from a lateral side thereof;

a variable-ratio transmission having a drive pulley connected to said output shaft of said engine, a driven pulley, and a rotation transferring member rotationally coupling said drive pulley with said driven pulley;

a gear box having an input gear and an output gear therein;

a connecting shaft supporting both said driven pulley of said variable-ratio transmission and said input gear thereon;

a drive shaft supporting said output gear thereon for rotatably driving said track device; and a pair of bearings located within said gear box and supporting said connecting shaft, said connecting shaft being exclusively rotatably supported by said pair of bearings, wherein said gear box and said variable-ratio transmission are each disposed on said lateral side of said engine.

14. A snowmobile comprising:

a body;

a steering ski supported on a front portion of the body;

a track device suspended from a rear portion of the body;

an engine supported on the body at a position between said steering ski and said track device, said engine having an output shaft extending outwardly from a lateral side thereof;

a variable-ratio transmission having a drive pulley connected to said output shaft of said engine, a driven pulley, and a rotation transferring member rotationally coupling said drive pulley with said driven pulley;

a gear box having an input gear and an output gear therein;

a connecting shaft supporting both said driven pulley of said variable-ratio transmission and said input gear thereon; and a drive shaft supporting said output gear thereon for rotatably driving said track device, wherein said gear box and said variable-ratio transmission are each disposed on said lateral side of said engine, and said drive shaft is a hollow tubular member.

* * * * *